(12) United States Patent
Sakamoto et al.

(10) Patent No.: US 6,522,371 B1
(45) Date of Patent: Feb. 18, 2003

(54) LIQUID CRYSTAL DISPLAY AND MANUFACTURING METHOD THEREOF

(75) Inventors: Takuya Sakamoto, Kumamoto (JP); Hiroshige Hayasaki, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 226 days.

(21) Appl. No.: 09/650,282

(22) Filed: Aug. 29, 2000

(30) Foreign Application Priority Data

Sep. 7, 1999 (JP) .......................................... 11-252600
Aug. 9, 2000 (JP) ....................................... 2000-240761

(51) Int. Cl.[7] ........................................... G02F 1/1333
(52) U.S. Cl. ........................................ 349/58; 362/362
(58) Field of Search .......................... 349/58; 362/362, 362/364, 365, 368; 361/600, 681

(56) References Cited

U.S. PATENT DOCUMENTS 6,175,396 B1 * 1/2001 Kim et al. ..................... 349/58
6,220,741 B1 * 4/2001 Kawachi et al. ............ 362/561
6,392,723 B1 * 5/2002 Sugiyama et al. ............ 349/58

FOREIGN PATENT DOCUMENTS

JP          9-81050          3/1997

* cited by examiner

Primary Examiner—Toan Ton
Assistant Examiner—Hoan Nguyen
(74) Attorney, Agent, or Firm—McDermott, Will & Emery (57) ABSTRACT

A mold frame and a lamp cover composing a liquid crystal display are fixed without using a screw and without increasing the thickness of the liquid crystal display. They are fixed by creating projections at parts of the lamp cover, by creating receiving holes through the mold frame at the position corresponding to the projections and by inserting the projections through the receiving holes and by caulking the edge of the projections.

10 Claims, 9 Drawing Sheets

LIQUID CRYSTAL DISPLAY AND MANUFACTURING METHOD THEREOF

BACKGROUND OF THE INVENTION

1. Field of the Invention

The present invention relates to a liquid crystal display having a structure in which a lamp cover and a mold frame are fixed each other and to a method for manufacturing the liquid crystal display comprising a step of fixing the lamp cover with the mold frame.

2. Related Art Statement

Figure 12:
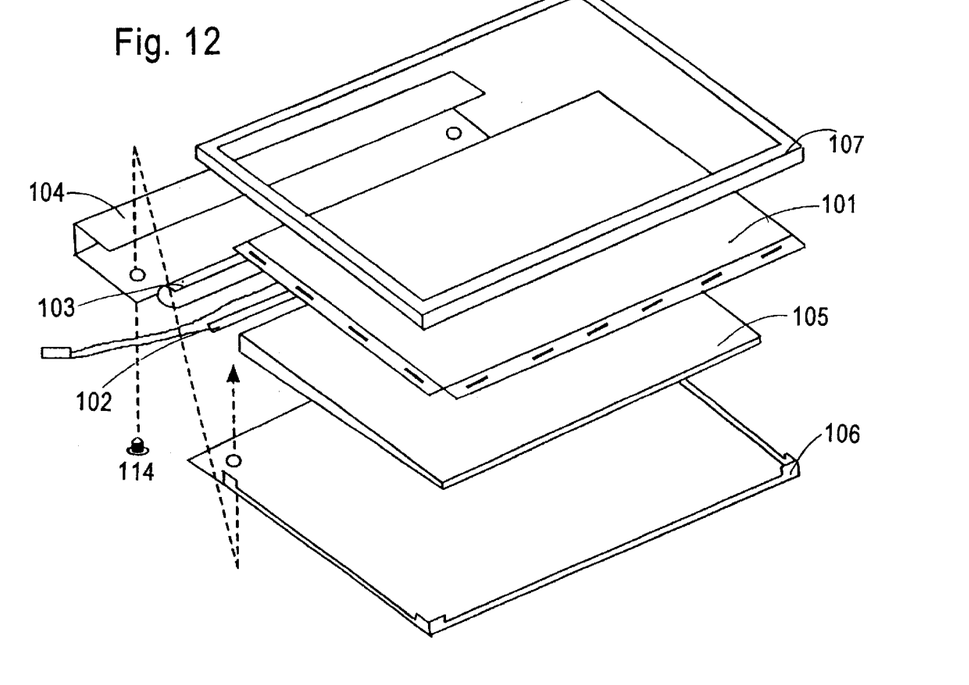
FIG. 12 is an exploded perspective view of a prior art liquid crystal display.

FIG. 12 shows one example of the internal structure of a prior art liquid crystal display which mainly comprises a liquid crystal panel 101 provided with a printed circuit board for driving the liquid crystal, a lamp unit 102, a lamp reflector 103, a lamp cover 104, a light guide plate unit 105, a mold frame 106 for supporting and fixing the liquid crystal panel 101 and the light guide plate unit 105, a screw 114 for fixing the lamp cover 104 and the mold frame 106 and a front frame 107 fixed on the upper face of the liquid crystal panel 101. In the liquid crystal display constructed as described above, the lamp cover 104 and the mold frame 106 are fixed from each other by using the screw 114.

Figure 13:
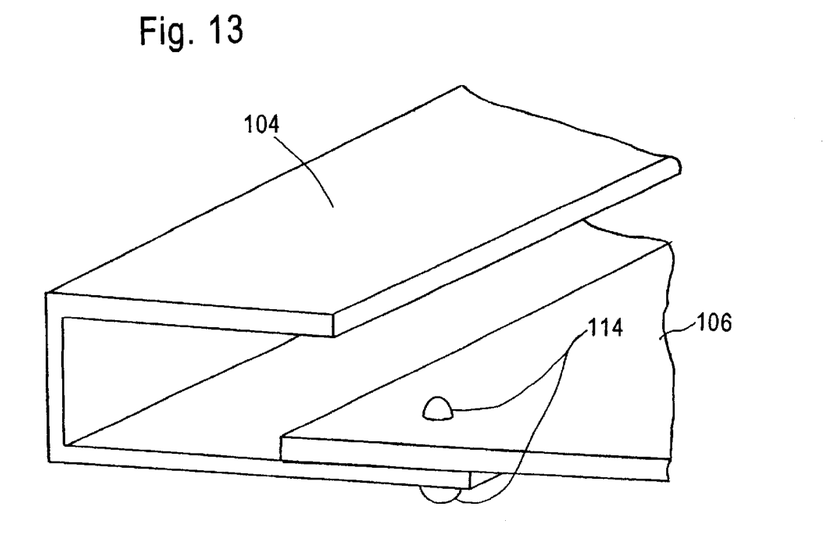
FIG. 13 is an enlarged view of the main part of the prior art liquid crystal display.

FIG. 13 is an enlarged perspective view showing part where the lamp cover 104 is fixed with the mold frame 106. As shown in FIG. 13, when the lamp cover 104 is fixed with the mold frame 106 by using the screw 114, the thickness of the liquid crystal display has been thickened by the thickness of the screw, i.e., by the thickness of the lamp cover 104 and the screw 114 projecting out of the surface of the mold frame 106.

Japanese Patent Laid-Open No. Hei. 9-81050 has disclosed a method for fixing a light guide plate with a circuit board which are components of a liquid crystal display as another prior art. Although it has disclosed the structure for mounting the light guide plate by fixing it with the circuit board by thermal caulking or a fixing claw, it has disclosed no means for fixing the lamp cover with the mold frame.

In view of the problem described above, the present invention proposes a novel liquid crystal display which may be thinned by improving means for fixing the lamp cover with the mold frame.

The invention also proposes a method for manufacturing a novel liquid crystal display by improving the process for fixing the lamp cover with the mold frame.

SUMMARY OF THE INVENTION

An inventive liquid crystal display comprises a liquid crystal panel; a light guide plate unit for spreading light emitted from a lamp unit to the back of the liquid crystal panel; a lamp cover surrounding the lamp unit; and a mold frame supporting the liquid crystal panel and the light guide plate unit. In the liquid crystal display, the lamp cover is fixed to the mold frame by caulking projections provided so as to project from the lamp cover to the mold frame to receiving holes provided through the mold frame in areas where the lamp cover overlaps with the mold frame.

In the inventive liquid crystal display constructed as described above, the projection is provided with a plurality of projecting pieces and the lamp cover is fixed to the mold frame by bending and caulking the edge of the projecting pieces at least into two different directions, respectively.

In the inventive liquid crystal display constructed as described above, the projection is a projecting piece which extends in one direction along the surface of the lamp cover and the receiving hole is opened in slit along the direction in which the projecting piece extends.

In the inventive liquid crystal display constructed as described above, the projection is a projecting piece which is formed by bending up a notch provided at the edge of the lamp cover and the receiving hole is formed by a cutaway section provided at the edge of the mold frame overlapping with the area where the projecting piece is formed.

In the inventive liquid crystal display constructed as described above, the section of the receiving hole of the mold frame where the edge of the projection contacts is cut aslant, is provided with a step or is rounded.

In the inventive liquid crystal display constructed as described above, the edge of the projection caulked to the receiving hole stays within the receiving hole and does not project out of the surface of the mold frame.

In the inventive liquid crystal display constructed as described above, the projection is cylindrical and is caulked to the mold frame by its peripheral edge portion.

An inventive manufacturing method of a liquid crystal display comprises steps of forming projections which project out of the surface of a lamp cover at part of the lamp cover surrounding a lamp unit for illuminating light to a liquid crystal panel; opening receiving holes which penetrate through the mold frame at areas of the mold frame for supporting the liquid crystal panel and a light guide plate unit which spreads light to the back of the liquid crystal panel; and fixing the lamp cover to the mold frame by inserting the projection through the receiving hole and by bending and caulking the edge of the projection.

In the inventive manufacturing method of the liquid crystal display composed of the steps described above, the projection is provided with a plurality of projecting pieces and the edge of the projecting piece is bent at least into two different directions, respectively, in caulking the projecting piece to the receiving hole.

In the inventive manufacturing method of the liquid crystal display composed of the steps described above, a working jig having a working plane for forming the edge of the projection along the shape of the section of the receiving hole is used to bend and caulk the edge of the projection by pressing it to the edge of the projection.

The specific nature of the invention, as well as other objects, uses and advantages thereof, will clearly appear from the following description and from the accompanying drawings in which like numerals refer to like parts.

DESCRIPTION OF THE PREFERRED EMBODIMENTS

[First Embodiment]

Figure 1:
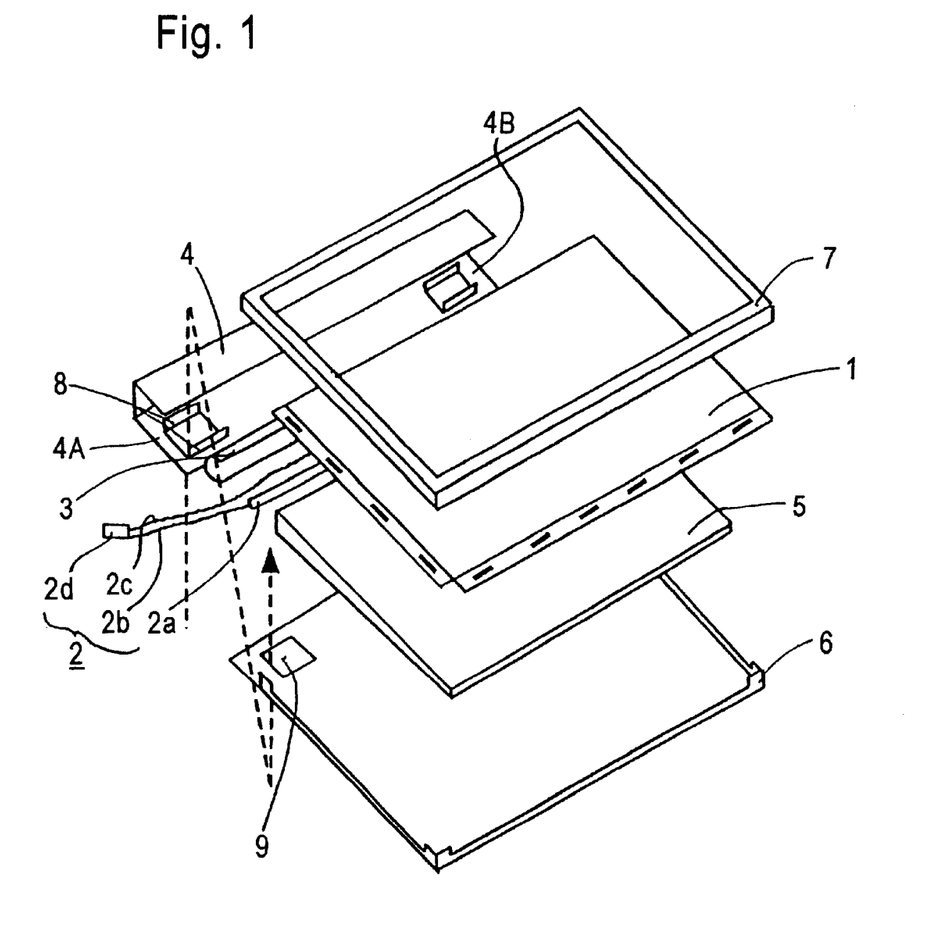
FIG. 1 is an exploded perspective view of a liquid crystal display according to a first embodiment of the invention.
Figure 2:
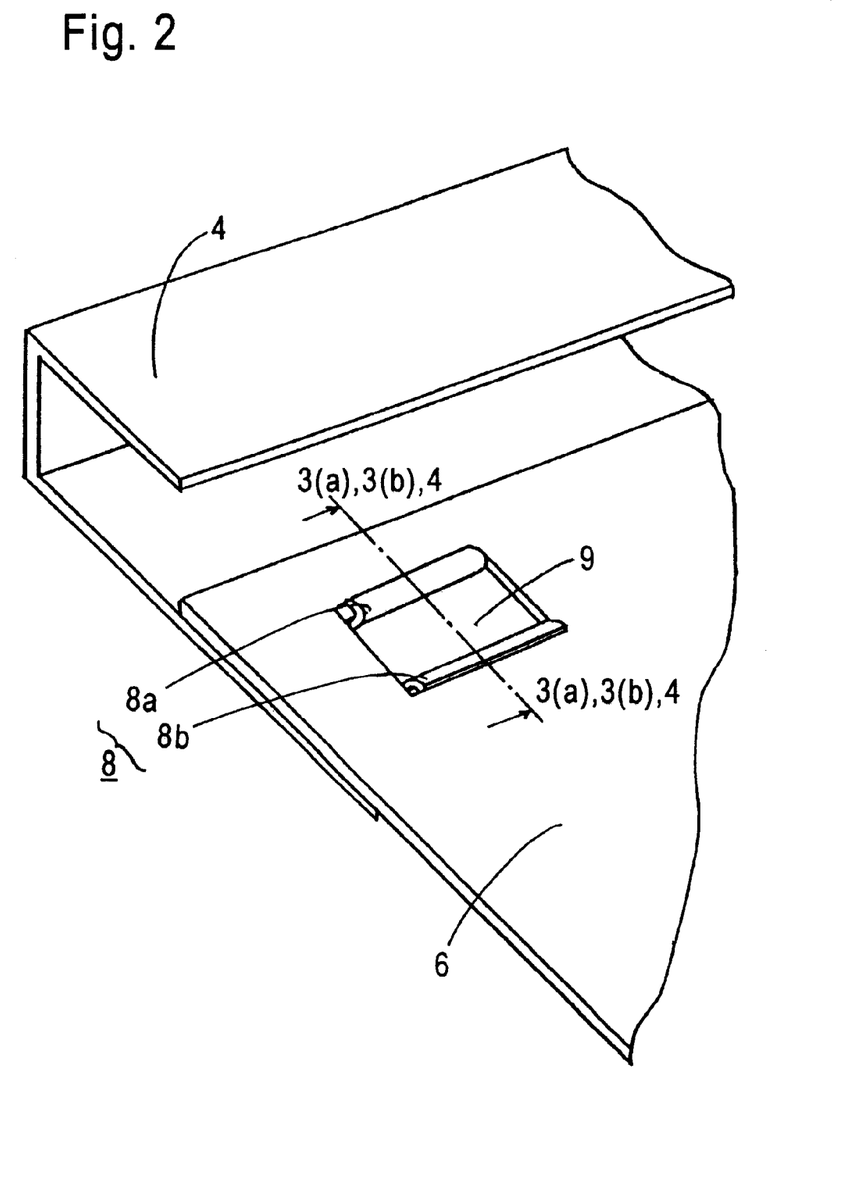
FIG. 2 is an enlarged view of the main part of the liquid crystal display of the first embodiment.

FIG. 1 is an exploded perspective view of a liquid crystal display according to a first embodiment of the invention and FIG. 2 is an enlarged view of the main part of the liquid crystal display in FIG. 1.

In FIGS. 1 and 2, the liquid crystal display comprises a liquid crystal panel 1 having a liquid crystal driving printed board and a lamp unit 2 having a lamp 2a, a hot side lamp lead wire 2b connected to one end of the lamp 2a, a cold side lamp lead wire 2c whose one end is connected to the other end of the lamp 2a and a lamp connector 2d to which the other ends of the hot and cold side lamp lead wires 2b and 2c are connected.

The liquid crystal display also comprises a lamp reflector 3 which is attached to the edge of a light guide plate unit 5 while surrounding the lamp 2a to reflect light emitted from the lamp 2a to the side of the light guide plate unit 5, a lamp cover 4 which covers the outer surface of the lamp reflector 3 and is made of metal, a mold frame 6 which covers the bottom side of the liquid crystal panel 1 and is made of a plastic material for example, a front frame 7 which covers the outer periphery of the upper plane of the liquid crystal panel 1 and a projection 8 which is provided on the lamp cover 4. According to the first embodiment, the projection 8 is a pair of projecting pieces which face to each other and is formed by cutting and opening a part of a member composing the lamp cover 4 and is bent toward the inside of the cover so that it projects out of the surface of the lamp cover 4. A receiving hole 9 is formed so that it penetrates through the mold frame 6 so that the projection 8 may be fitted to an area covering with the projection 8.

As shown in FIG. 2, the projection 8 is inserted through the receiving hole 9 provided through the mold frame 6, the edge of the projecting piece 8a is bent along the section of the receiving hole 9 and another projectioning piece 8b pairing with the projecting piece 8a is bent in the opposite or different direction to caulk and to fix the mold frame 6 with the lamp cover 4 while preventing the mold frame 6 from falling off. In case of FIG. 2, the mold frame 6 is fixed to the lamp cover 4 by the projections 8 at the both end parts 4A and 4B of the lamp cover 4 as shown in FIG. 1 for example.

FIG. 3 is a section view taken along a line A—A in FIG. 2. It is noted that in FIG. 3, the reference numeral (10) denotes a working jig which is used in caulking the edge of the projection 8 and h as a circular arc plane R so that the width thereof increases toward the outside at the working plane for bending the edge of the projection 8. This circular arc plane is formed so as to reflect the shape of the section of the receiving hole 9 of the mold frame 6 for example.

Figure 3A:
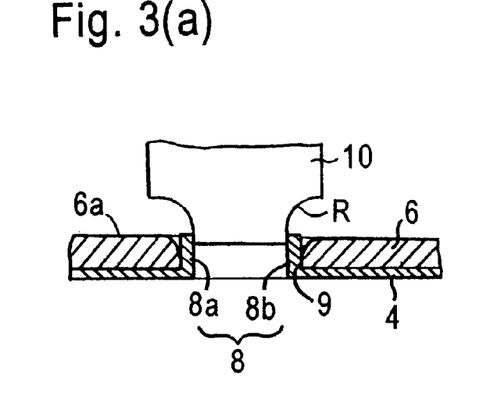
FIG. 3 is a section view showing steps for manufacturing the liquid crystal display of the first embodiment.

In caulking the projection 8 to the receiving hole 9, the projection 8 whose edge is not bent is inserted through the receiving hole 9 and the working jig 10 is set between the pair of projectioning pieces at first as shown in FIG. 3A.

Figure 3B:
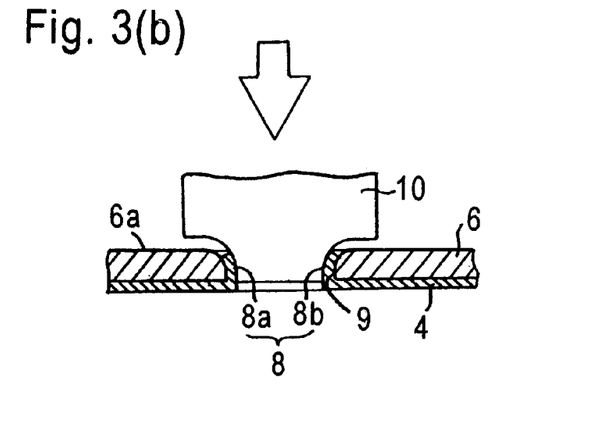

Then, the working jig 10 is pressed to the edge of the projection 8 to bend and caulk the edge of the projection 8 into the shape of the circular arc plane of the working jig 10 as shown in FIG. 3B. It becomes possible to suppress the shape of the projectioning pieces from fluctuating after the work by caulking the edge of the projection 8 by using the working jig 10.

It is also possible to bend and caulk the edge of the projection 8 by pliers or a screw driver without using the working jig 10.

It is also effective for thinning the apparatus to work the section of the upper plane of the mold frame 6, i.e., the section of the receiving hole 9 where the edge of the projection 8 contacts in advance so that the edge of the projection 8 does not protrude out of the upper surface 6a of the mold frame 6 after bending by rounding, by cutting aslant or by providing a step.

Figure 4:
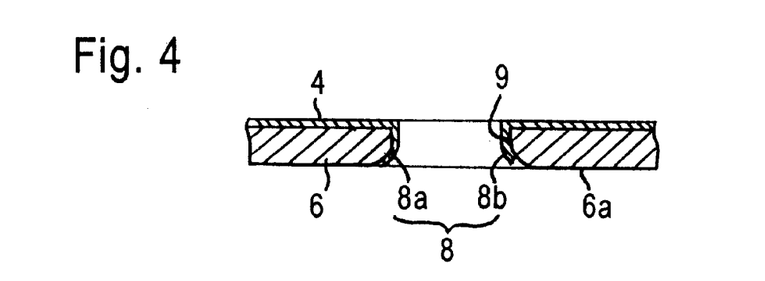
FIG. 4 is a section view showing another structure for fixing the liquid crystal display of the first embodiment.

It is also possible to pile and fix the lamp cover 4 with the mold frame 6 so that the mold frame 6 comes to the outside of the lamp cover 4 as shown in FIG. 4 because the thickness of the part where the lamp cover 4 is fixed with the mold frame 6 does not increase by fixing them as described above. In this case, the projection 8 is bent to the outside of the cover, not to the inside of the cover as shown in FIG. 1, so that the projection 8 protrude in the opposite direction, is inserted through the receiving hole 9 and is caulked.

The lamp cover 4 may be fixed to the mold frame 6 stably by bending at least two edges of the projection 8 in the opposite directions or in the two different directions as described above from the point of view of preventing the mold frame 6 from falling off at the part (caulking section) where the mold frame 6 is fixed with the lamp cover 4.

Figure 5A:
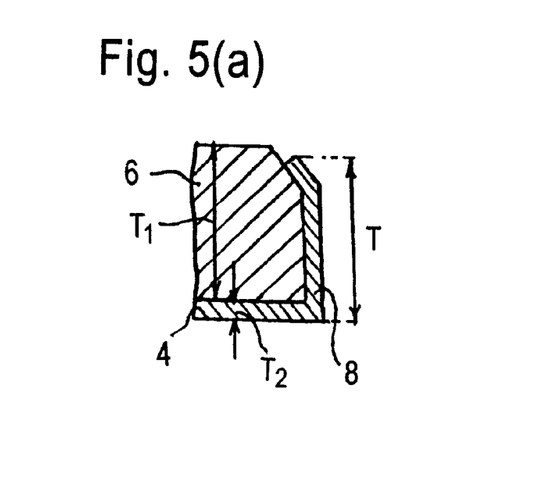
FIG. 5 is a section view showing the fixed part of the liquid crystal display of the first embodiment.
Figure 5B:
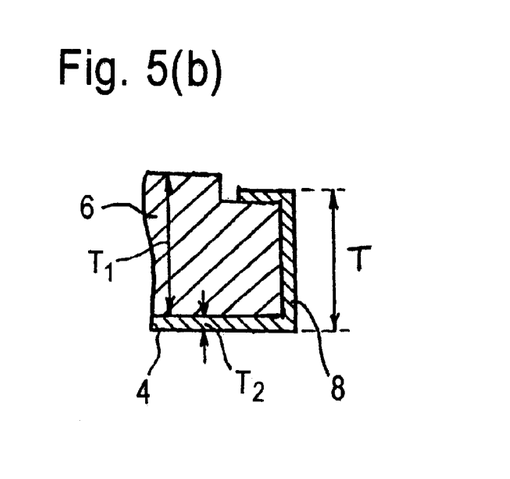

FIG. 5 is a section view showing the part where the lamp cover 4 is fixed with the mold frame 6 and explaining the relationship among the thickness of the lamp cover 4, the thickness of the mold frame 6 and the degree of projection of the projectioning piece after bending (degree of projection from the plane where the lamp cover 4 and the mold frame 6 do not contact).

FIG. 5A shows a case when the section of the receiving hole 9 of the mold frame 6 where the edge of the projection 8 contacts is cut aslant and FIG. 5B shows a case when the section of the receiving hole 9 is provided with a step. In any case, the thickness of the liquid crystal display will not increase because the projection 8 stays within the receiving hole 9 and the edge of the projection 8 does not protrude out of the mold frame 6 even after the projection 8 is bent by adjusting the dimensions so that the projection (T) of the projection 8 after bending becomes short of the total thickness of the mold frame 6 (T1) and the lamp cover 4 (T2).

Because the lamp cover 4 may be fixed with the mold frame 6 without using a screw as described above, the thickness of the liquid crystal display may be thinned by the thickness of the screw.

Still more, the inventive liquid crystal display requires no parts such as a screw which has been otherwise required for fixing them because the projection 8 used for the fixation is formed in a body with the lamp cover 4 by working the metallic lamp cover 4.

[Second Embodiment]

A second preferred embodiment of the invention will be explained next.

The case of fixing the lamp cover 4 with the mold frame 6 by creating the receiving hole 9 whose plan shape of the opening is square through the mold frame 6 and by bending the projection 8 created along the parallel two sides has been described in the first embodiment. A case of creating slit like receiving holes through the mold frame 6 will be explained in the second embodiment.

Figure 6:
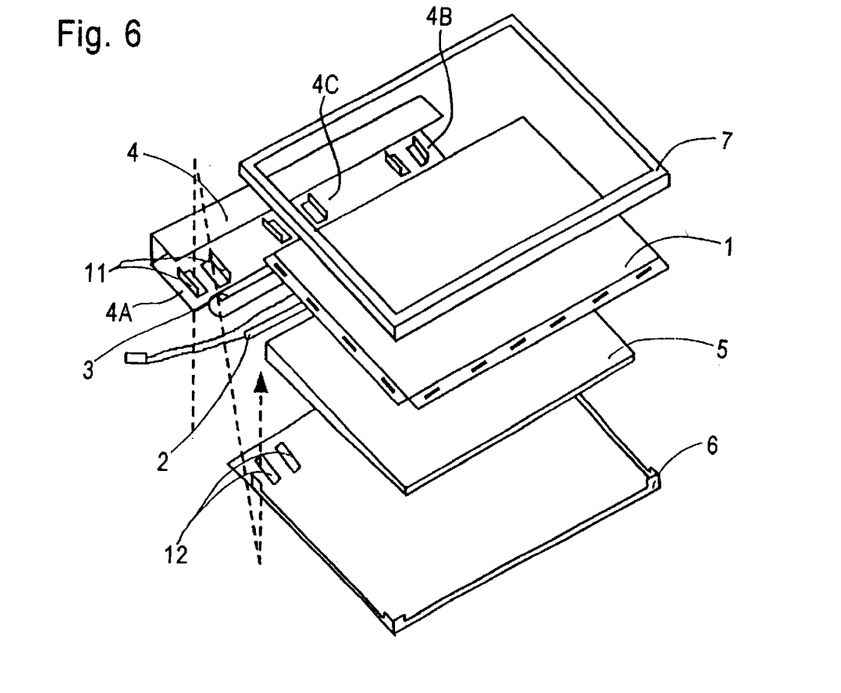
FIG. 6 is an exploded perspective view of a liquid crystal display according to a second embodiment of the invention.
Figure 7:
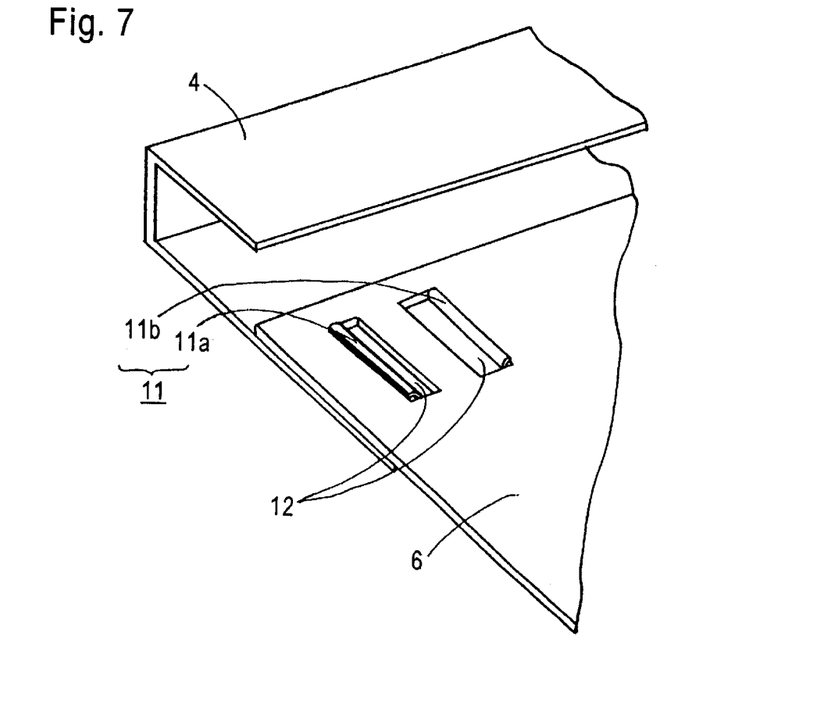
FIG. 7 is an enlarged view of the main part of the liquid crystal display of the second embodiment.

FIG. 6 is an exploded perspective view of a liquid crystal display according to a second embodiment and FIG. 7 is an enlarged view of the main part of the liquid crystal display of the second embodiment. It is noted that the reference numerals (11) denotes projectioning pieces and (12) the slit-like receiving hole. The same reference numerals used for the explanation above denote the same or corresponding parts.

As shown in FIG. 6, the slid-like receiving holes 12 which extend in one direction, respectively, are provided at the edges 4A and 4B and the center 4C of the part where the mold frame 6 is fixed with the lamp cover 4. Then, they may be fixed by inserting projecting pieces 11 provided on the side of the lamp cover 4 through the receiving holes 12 and by caulking the edge portions of the pieces as shown in FIG. 7.

It is noted that they may be fixed stably by preventing the mold frame 6 from falling off by bending the edges of the pair of projecting pieces in the two different directions, respectively.

While six projecting pieces are provided in total in the second embodiment, the fixation may be achieved by bending and caulking at least two projecting pieces among them in the different directions.

It is also needless to say that although FIG. 7 shows the state in which the mold frame 6 is piled on the lamp cover 4 at the fixing section, the fixation may be achieved stably without increasing the thickness of the liquid crystal display by setting the direction for bending the projecting pieces 11 in FIG. 6, i.e., the projecting direction, in the opposite direction and by caulking so that the lamp cover 4 is piled up on the mold frame 6.

[Third Embodiment]

Next, a third preferred embodiment of the invention will be explained.

While the cases of creating the projection 8 or the projecting piece 11 at the positions other than the edge of the lamp cover 4 have been explained in the first and second embodiments, a case of fixing them by cutting a part of the edge of the lamp cover 4, by creating projecting pieces by bending up the cut and by caulking it to a cutaway section created by cutting the part of the mold frame 6 corresponding to the part for fixing the lamp cover 4.

Figure 8:
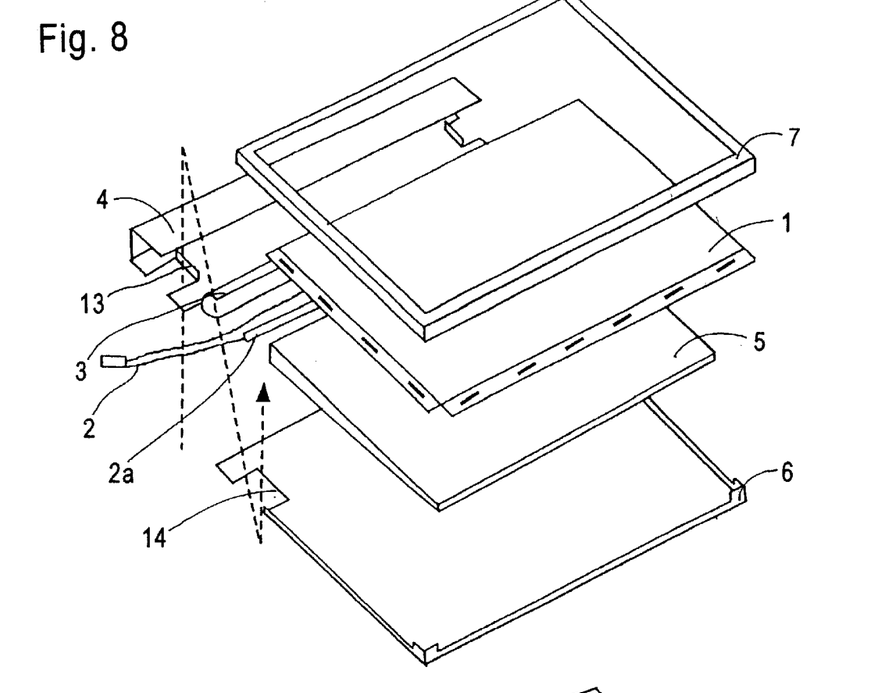
FIG. 8 is an exploded perspective view of a liquid crystal display according to a third embodiment of the invention.
Figure 9:
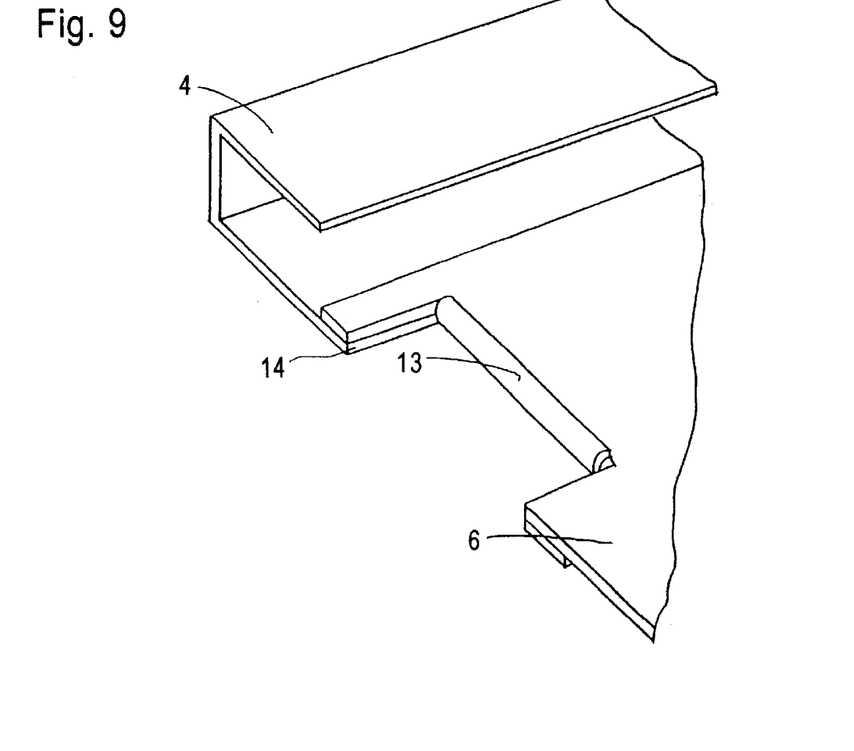
FIG. 9 is an enlarged view of the main part of the liquid crystal display of the third embodiment.

FIG. 8 is an exploded perspective view of a liquid crystal display according to a third embodiment of the invention and FIG. 9 is an enlarged view of the part where the lamp cover 4 is fixed with the mold frame 6. In the figures, the reference numerals (13) denotes projecting pieces created by cutting the edge located at the both ends of the lamp 2a of the lamp cover 4 and by bending up the cut and (14) cutaway sections created at the area of the mold frame 6 overlapping with the projecting piece 13 created at the lamp cover 4. The same reference numerals which have been already used for the explanation denote the same or corresponding parts.

The mold frame 6 may be fixed with the lamp cover 4 by creating the projecting piece 13 by creating the cut at the edges of the lamp cover 4 located at the both ends of the lamp 2a and by bending up the cut to the inner surface side of the lamp cover 4, by inserting through them to the cutaway section 14 created in correspondence to the projecting piece 13 at the edges of the mold frame 6 and by caulking the edge of the projecting piece 13.

In this case, the cutaway section 14 are created at the both ends of the mold frame 6 and the edge of the projecting piece 13 is bent in the opposite directions at those two places to fix and to prevent the mold frame 6 from falling off.

It is needless to say that the mold frame 6 may be fixed with the lamp cover 4 favorably without increasing the thickness of the liquid crystal display even when the mold frame 6 and the lamp cover 4 are piled in the other way and by caulking them by setting the projecting direction of the projecting piece 13 shown in FIG. 9 in the opposite direction.

Further, the embodiment described above shows just one exemplary case of plan shape projecting piece and they may be fixed by the fixation in the same manner even when the projecting piece is formed into another shape.

[Fourth Embodiment]

Figure 10:
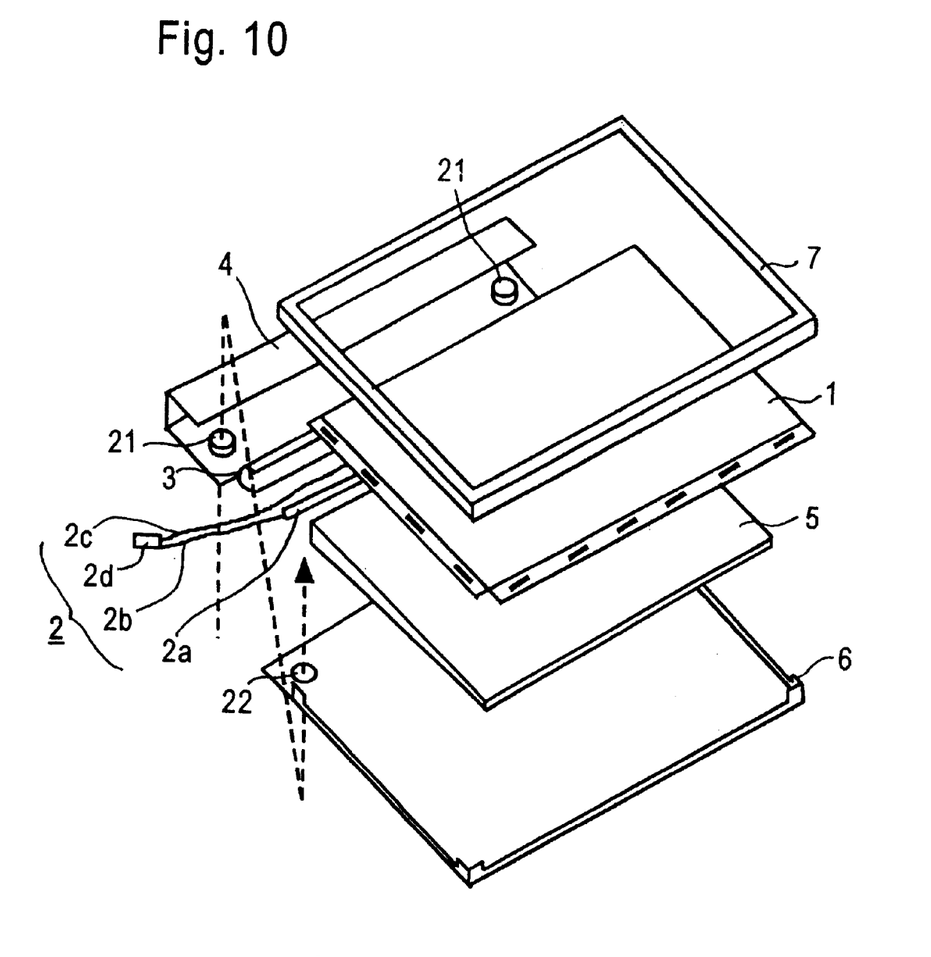
FIG. 10 is an exploded perspective view of a liquid crystal display according to a fourth embodiment of the invention.
Figure 11:
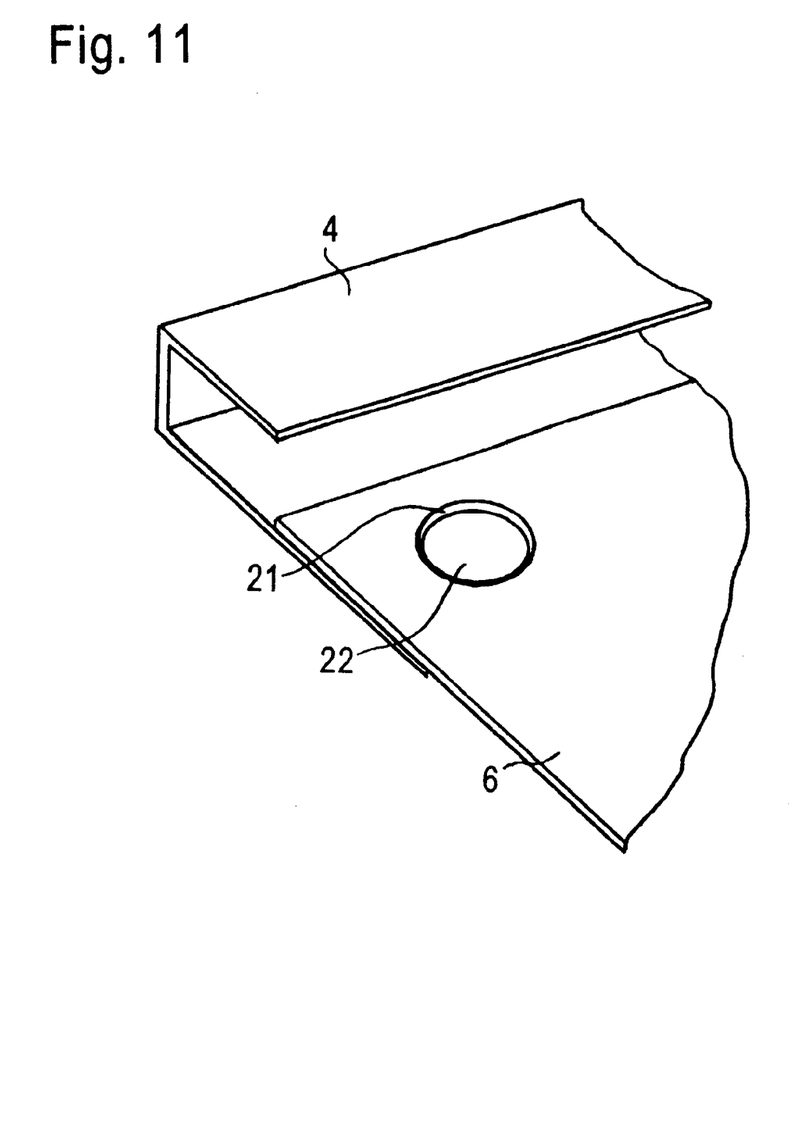
FIG. 11 is an enlarged view of the main part of the liquid crystal display of the fourth embodiment.

FIGS. 10 and 11 show a fourth embodiment of the inventive liquid crystal display, wherein FIG. 10 is an exploded perspective view and FIG. 11 is an enlarged view of the main part thereof. A cylindrical projecting section 21 is created and a corresponding circular receiving hole 22 is created in the fourth embodiment. The cylindrical projecting section 21 is created by drawing the lamp cover 4. It is fitted into the receiving hole 22 and is caulked to the outer edge portion of the receiving hole 22 by expanding the edge thereof into the outer edge direction.

The caulked edge of the projecting section 21 stays within the receiving hole 22 and does not project out of the surface 6a of the mold frame 6 also in the four embodiment, so that the thickness of the fixing part may be reduced in the same manner with the first through third embodiments described above.

As described above, according to the inventive liquid crystal display, the lamp cover may be fixed with the mold frame by caulking the projecting section provided on the lamp cover to the receiving hole provided through the mold frame without using a screw and the liquid crystal display may be thinned by the thickness of the screw.

In addition to the above-mentioned effect, the inventive liquid crystal display can suppress the mold frame from falling off from the part where the lamp cover is fixed with the mold frame because the plurality of projecting pieces are bent and caulked in the two different directions, respectively.

In addition to those effects described above, the inventive liquid crystal display has the effect that the projecting pieces used for the fixation may be created by cutting a part of the lamp cover and by bending up the notch and that no other fixing parts need to be prepared.

In addition to those effects described above, the invention can thin the liquid crystal display because it allows the edge of the bent projection to be kept inside of the surface of the mold frame by creating the section of the receiving hole where the edge of the projection contacts by cutting aslant, by providing a step or by rounding up.

The inventive manufacturing method of the liquid crystal display allows the lamp cover to be fixed with the mold frame by creating the projection at part of the lamp cover and by caulking the projection to the receiving hole provided through the mold frame and allows the liquid crystal display to be thinned by the thickness of a screw because no other parts such as a screw need to be prepared for the fixation.

The inventive manufacturing method of the liquid crystal display allows to suppress the shape of the edge of the projection from fluctuating after bending by using the working jig having a working plane for forming the edge of the projection along the shape of the section of the receiving hole in bending the edge of the projection.

While the preferred embodiments have been described, variations thereto will occur to those skilled in the art within the scope of the present inventive concepts which are delineated by the following claims.

What is claimed is:

1. A liquid crystal display comprising:

a liquid crystal panel;

a light guide plate unit for spreading light emitted from a lamp unit to the back of said liquid crystal panel;

a lamp cover surrounding said lamp unit; and a mold frame supporting said liquid crystal panel and said light guide plate unit; wherein said lamp cover is fixed to said mold frame by caulking projections provided so as to project from said lamp cover to said mold frame to receiving holes provided through said mold frame in areas where said lamp cover overlaps with said mold frame.

2. The liquid crystal display according to claim 1, wherein said projection is provided with a plurality of projecting pieces and said lamp cover is fixed to said mold frame by bending and caulking the edge of said projecting pieces at least into two different directions, respectively.

3. The liquid crystal display according to claim 1, wherein said projection is a projecting piece which extends in one direction along the surface of said lamp cover and said receiving hole is opened in slit along the direction in which said projecting piece extends.

4. The liquid crystal display according to claim 1, wherein said projection is a projecting piece which is formed by bending up a notch provided at the edge of said lamp cover and said receiving hole is formed by a cutaway section provided at the edge of said mold frame overlapping with the area where said projecting piece is formed.

5. The liquid crystal display according to claim 1, wherein the section of the receiving hole of said mold frame where the edge of said projection contacts is cut aslant, is provided with a step or is rounded.

6. The liquid crystal display according to claim 1, wherein the edge of said projection caulked to said receiving hole stays within said receiving hole and does not project out of the surface of said mold frame.

7. The liquid crystal display according to claim 1, wherein the projection is cylindrical and is caulked to said mold frame by its peripheral edge portion.

8. A manufacturing method of a liquid crystal display, comprising steps of:

forming projections which project out of the surface of a lamp cover at part of said lamp cover surrounding a lamp unit for illuminating light to a liquid crystal panel;

opening receiving holes which penetrate through said mold frame at areas of said mold frame for supporting said liquid crystal panel and a light guide plate unit which spreads light to the back of said liquid crystal panel; and fixing said lamp cover to said mold frame by inserting said projection through said receiving hole and by bending and caulking the edge of said projection.

9. The manufacturing method of the liquid crystal display according to claim 8, wherein said projection is provided with a plurality of projecting pieces and the edge of said projecting piece is bent at least in two different directions, respectively, in caulking said projecting piece to said receiving hole.

10. The manufacturing method of the liquid crystal display according to claim 8, wherein a working jig having a working plane for forming the edge of said projection along the shape of the section of said receiving hole is used to bend and caulk the edge of said projection by pressing it to the edge of said projection.

* * * * *